(12) United States Patent
Ward

(10) Patent No.: US 6,623,169 B2
(45) Date of Patent: *Sep. 23, 2003

(54) BEARING HOUSING INCORPORATING ANTIMICROBIAL AGENT

(75) Inventor: Robert E. Ward, Simpsonville, SC (US)

(73) Assignee: Reliance Electric Technologies, LLC, Mayfield Heights, OH (US)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

This patent is subject to a terminal disclaimer.

(21) Appl. No.: 09/252,894

(22) Filed: Feb. 18, 1999

(65) Prior Publication Data

US 2003/0095732 A1 May 22, 2003

Related U.S. Application Data

(62) Division of application No. 08/921,094, filed on Aug. 29, 1997, now Pat. No. 6,089,758.

(51) Int. Cl.[7] .............................................. F16C 35/00
(52) U.S. Cl. ........................ 384/624; 384/438; 384/441
(58) Field of Search ................................ 384/428, 206, 384/434, 438, 441, 624

(56) References Cited

U.S. PATENT DOCUMENTS

| | | | |
|---|---|---|---|
| 4,005,917 A | * | 2/1977 | Richardson et al. |
| 4,291,927 A | * | 9/1981 | Persson |
| 4,932,948 A | | 6/1990 | Kernes |
| 4,968,323 A | * | 11/1990 | Blackburn et al. |
| D343,179 S | | 1/1994 | Waskiewicz .............. D15/143 |
| 5,395,171 A | | 3/1995 | Waskiewicz ............... 384/428 |
| 5,433,530 A | | 7/1995 | Waskiewicz ............... 384/206 |
| 5,554,373 A | * | 9/1996 | Seabrook et al. |

OTHER PUBLICATIONS

Article from The Torrington Co., Fafnir Bearings Division, "High–Performance Polymer Ball Bearing Housed Units", pages and date not known.
Article from MRC Bearing Services, "Marathon Series Composite Mounted Bearing Units", pp. 1–5, Jan. 1996.
Article from Dodge, "Sleeve Bearings", pp. 590–591, date unknown.

* cited by examiner

Primary Examiner—Lenard A. Footland
(74) Attorney, Agent, or Firm—Patrick S. Yoder; Alexander M. Gerasimow; William R. Walbrun

(57) ABSTRACT

A molded polymeric bearing housing is formed of a moldable polymer base material in combination with a glass fiber reinforcing component. A foaming agent is added to the base material to create a fine structural foam within interior regions of the housing. A density gradient is established between regions adjacent to the surfaces of the housing and the internal regions, thereby reducing the need for reinforcing ribs particularly in a base or mounting portion of the housing. An antimicrobial agent may be added to the housing material to inhibit the growth and proliferation of fungi, molds, bacteria, and so forth. Structural features of the housing may be formed subsequent to the molding process, such as by turning operations. Metal inserts may be provided to avoid crushing of regions of the housing, such as by attachment fasteners. The housing forms a mounting base surface in a single plane coextensive with the footprint of the housing. When the housing is placed in service moisture and debris is prevented from collecting below the housing by conformity of the mounting base surface with the machine support surface. The housing may be formed in a variety of styles, including pillow block styles, tapped base pillow block styles, two and four bolt flange styles, take up frame styles, flange bracket styles and so forth.

19 Claims, 9 Drawing Sheets

BEARING HOUSING INCORPORATING ANTIMICROBIAL AGENT

This application is a divisional of Application Serial No. 08/921,094 filed Aug. 29, 1997 U.S. Pat. No. 6,089,758.

BACKGROUND OF THE INVENTION

1. Field of the Invention

The present invention relates generally to the field of antifriction bearings and housings for such bearings. More particularly, the invention relates to a molded polymeric bearing housing including features advantageous in certain applications, such as in the food and beverage industries.

2. Description of the Related Art

A wide range of applications exist for antifriction bearings, such as ball bearings, roller bearings, needle bearings and the like. In many industrial and material handling systems, such bearings perform a fundamental function of permitting rotating machine elements to turn with little resistance and thereby to effectively transmit power and motion between drive system components. Applications for such bearings include conveyors, mixers, pump drives, and the like, to mention just a few.

In general, bearings of the type commonly used in most industries include an inner race, an outer race, and a plurality of antifriction bearing elements disposed therebetween. The bearing elements are captured by the races and permit the races to rotate freely with respect to one another. The bearing assembly is typically installed in and supported by a housing. A number of housing types are known and are in common usage, including pillow block styles, two and four bolt flanged styles, take-up frame styles, and so forth. In addition to supporting the bearing inserts, such housings include features that permit them to be easily attached to machine frames and other support structures at the application. Depending upon the housing style, these features typically include support feet or flanges traversed by apertures for receiving fasteners. Once mounted on the machine frame, a base surface of the bearing housing generally abuts the machine frame and forms a solid foundation for both the bearing insert and for the machine elements held in rotation by the bearing insert.

Housings of the type described above are commonly made of a variety of materials depending upon the particular application, the loads to which the bearing insert will be subjected and the environmental conditions of the application. For example, in most bearing styles, metal housings provide sufficient mechanical support and resistance to loads. However, such metal housings are not well-suited to certain applications. Specifically, in certain industries health or environmental constraints may make the use of metal bearing housings difficult or impossible. In the food and beverage industries, for example, health requirements often necessitate frequent washing of processing and material handling equipment including bearings and their housings. Under such conditions, conventional metal housings may tend to corrode or otherwise degrade in ways that would contaminate the working conditions of the machinery and/or the product processed by the machinery. Similarly, in chemical processing industries and certain marine applications the presence of corrosive substances may significantly reduce the life of conventional metal bearing housings. In response, the industry has began to employ alternative materials for bearing housings, including certain plastics.

In general, conventional plastic bearing housings are available in the same styles as their metal counterparts. Thus, pillow block bearing styles are available from various manufacturers which differ only slightly from designs available in metal. However, due to manufacturing and processing constraints unique to plastic materials certain features of conventional plastic bearing housings present drawbacks which make them unsatisfactory in specific industrial applications. For example, due to the particular geometry of some bearing housing styles, such as pillow block housings, large volumes of the housing may be present in regions of the housing, while relatively thin or small volumes are present in other regions. Due to the exigencies of conventional injection molding processes, most conventional designs therefore include ribbed structures in the larger volumes regions to provide the requisite structural integrity, while providing sufficient material flow and curing in those regions and avoiding drawing during the curing process. In pillow block designs, for example, ribs are commonly provided below the bearing support and the lower support flanges. Some or all of these ribs contact the machine frame when the housing is installed, leaving voids or cavities below the bearing housing between the housing and the machine frame. While the plastic housing itself may perform adequately under frequent and repeated washdowns, such interstices left between the housing and the machine frame tend to remain wet or moist. Over time, these areas tend to promote the growth of fungi, molds, bacteria and other microorganisms reducing the utility of the housing and requiring additional downtime for cleaning or even replacement of the housing.

Industry responses to these problems have been less than satisfactory. For example, one response has been to fill the voids or interstices at the base of the bearing housing prior to placing the housing in service. In one known approach, the entire base of the housing is overmolded with an elastomeric or thermoplastic elastomer filler in an attempt to cover the voids and cavities. However, this solution provides a product which is non-uniform in appearance, and which requires additional tooling and manufacturing processes, adding to the cost of the final product.

There is a need, therefore, for an improved polymeric bearing housing which does not suffer from the drawbacks described above. In particular, there is a need for a bearing housing which can be used in applications where environmental or health conditions require superior resistance to corrosion, while inhibiting the proliferation of microorganisms.

SUMMARY OF THE INVENTION

The invention provides an innovative polymeric bearing housing and a method for making such a housing designed to respond to these needs. The housing may be constructed in a variety of conventional styles, including pillow blocks, tapped base pillow blocks, two and four bolt flanged models, take-up frame models, and so forth. All of the models are molded from a polymeric material which can be properly formulated to provide the requisite mechanical integrity, while providing features inhibiting growth of microbes. Specifically, in a preferred embodiment an admixture of the polymeric material and an antimicrobial agent is formed prior to molding. The resulting structure thereby inherently inhibits the proliferation of microbes on and about the bearing housing. In accordance with another preferred embodiment, a foaming agent is added to the polymeric material to create a molded structure having varying densities throughout. Specifically, regions of higher density are formed near surfaces of the housing, while structural foam regions comprise the interior of the housing. Conventional structural ribs in a lower portion of the housing are thereby made unnecessary. The housing therefore includes a substantially planar support base which can be mounted on a machine frame with substantially no interstices between the housing and the machine frame.

In a preferred embodiment, the base material from which the bearing housing is made has a light or white color to provide strong contrast with potentially contaminating substances, such as in food and beverage applications. Moreover, for such applications the base polymeric material and the other components added to the material all preferably comply with U.S. Food and Drug Administration standards, making the housing suitable for use on and around food, beverage, pharmaceutical and similar products.

Thus, in accordance with the first aspect of the invention, a bearing housing comprises a unitary body made of a moldable polymeric material. The body includes a bearing insert support portion configured to receive and support the bearing insert. The body also includes a support base configured to receive and cooperate with fasteners to secure the bearing housing to a substantially planar machine surface. The support base has a mounting surface extending substantially in a plane. Thus, the housing may be installed on a planar machine frame with no interstices formed between the body and the frame where moisture or other debris or fluids can collect.

In accordance with another aspect of the invention, a support housing is provided for a bearing insert of the type including an inner race, an outer race, and an plurality of bearing elements disposed therebetween. A support housing comprises a bearing insert support portion and an attachment portion. The bearing insert support portion is configured to receive and support the bearing insert. The attachment portion is formed integral with the bearing insert support portion and includes a plurality of apertures configured to receive fasteners for securing the support housing to a machine support surface. The bearing insert support portion and the attachment portion both comprise an antimicrobial agent or component for inhibiting growth of microorganisms. In a particularly advantageous arrangement, the bearing insert support portion and the attachment portion are made of an admixture of a moldable polymeric material and the antimicrobial agent.

In accordance with another aspect of the invention, a method is provided for manufacturing a housing for a bearing insert. The housing comprises a bearing insert support portion configured to receive and support the bearing insert, and a mounting portion integral with the bearing insert support portion and configured for securing the housing to a machine frame. In accordance with the method, an admixture of a moldable polymeric material and an antimicrobial agent is formed. The admixture is injected into a mold to integrally form the bearing insert support portion and the attachment portion. The housing is then allowed to partially or completely cure and is removed from the mold. In a preferred embodiment, temperatures of surfaces of the mold are controlled during the molding and curing steps to form a substantially closed skin on the housing.

In another preferred method for manufacturing a bearing housing, an admixture of a moldable polymeric material and a foaming agent is formed. The admixture is injected into a mold to integrally form the support portion and the mounting portion of the bearing housing. A parameter of the mold is controlled to form boundary regions adjacent to surfaces of the housing, and internal regions. The boundary regions have a somewhat higher density than the internal regions. The housing is then at least partially cured and subsequently removed from the mold.

BRIEF DESCRIPTION OF THE DRAWINGS

The foregoing and other advantages of the invention will become apparent upon reading the following detailed description and upon reference to the drawings in which.

DETAILED DESCRIPTION OF SPECIFIC EMBODIMENTS

Figure 1:
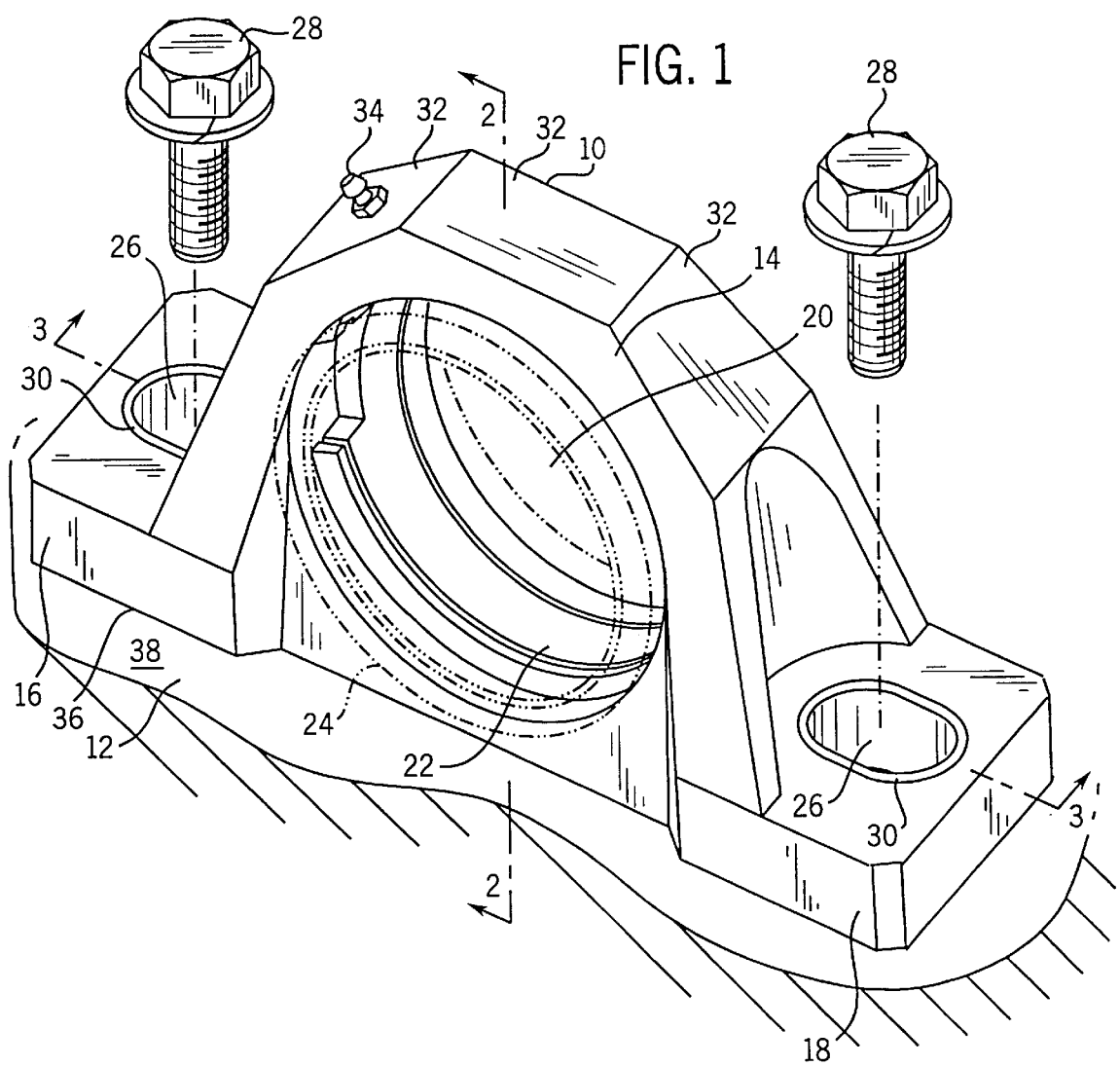
FIG. 1 is a perspective view of a pillow block style bearing housing in accordance with certain aspects of the invention.

Turning now to the drawings and referring first to FIG. 1, a bearing housing, designated generally by reference numeral 10, is illustrated as supported on a machine frame 12. In the embodiment illustrated in FIG. 1, bearing housing 10 is a flange mounted pillow block style having a central region 14 flanked by lateral mounting flanges 16 and 18. A central aperture 20 is formed in central region 14. An internal bearing support surface 22 bounds aperture 20 for supporting a bearing insert 24 (illustrated in broken lines in FIG. 1). It should be noted that the particular embodiment illustrated in FIG. 1 as well as alternative embodiments discussed below may be configured for supporting various types of bearing inserts of known configuration. In particular, housing 10 may be employed for supporting straight roller bearings, tapered roller bearings, ball bearings, needle bearings, sleeve bearings and so forth.

Each lateral mounting flange 16 and 18 includes mounting apertures 26 for receiving fasteners 28. Fasteners 28, typically threaded bolts, extend through apertures 26 when bearing housing 10 is installed, and into threaded bores (see FIG. 3) in machine frame 12. As will be appreciated by those skilled in the art, various securing arrangements may be utilized in place of threaded bores and fasteners 28, such as nut and bolt sets, and the like. In the presently preferred embodiment, support sleeves 30 are disposed within each mounting aperture to provide additional resistance of the mounting flanges to forces exerted by fasteners 28, thereby resisting crushing of the flanges. Sleeves 30 are preferably performed of metal, such as stainless steel, and secured within mounting apertures 26 during molding of housing 10 as discussed in greater detail below.

Central region 14 of housing 10 preferably includes upper faceted surfaces 32. A lubrication fitting 34 is threaded into one of the faceted surfaces to provide a lubrication path for bearing insert 24 as discussed below. Housing 10 further includes a substantially planar or flat mounting base 36 extending over its entire footprint. Thus, mounting base 36 lies substantially in a single plane beneath both lateral mounting flanges 16 and 18 and central region 14. This preferred configuration of housing 10 is particularly well suited for mounting on a machine frame 12 having a substantially planar support surface 38. As discussed in greater detail below, the use of an integral uniplanar mounting base 36 permits housing 10 to be mounted on planar surface 38 with no entrapped voids or volumes therebetween, reducing the potential for collecting moisture, debris and other substances beneath housing 10.

Figure 2:
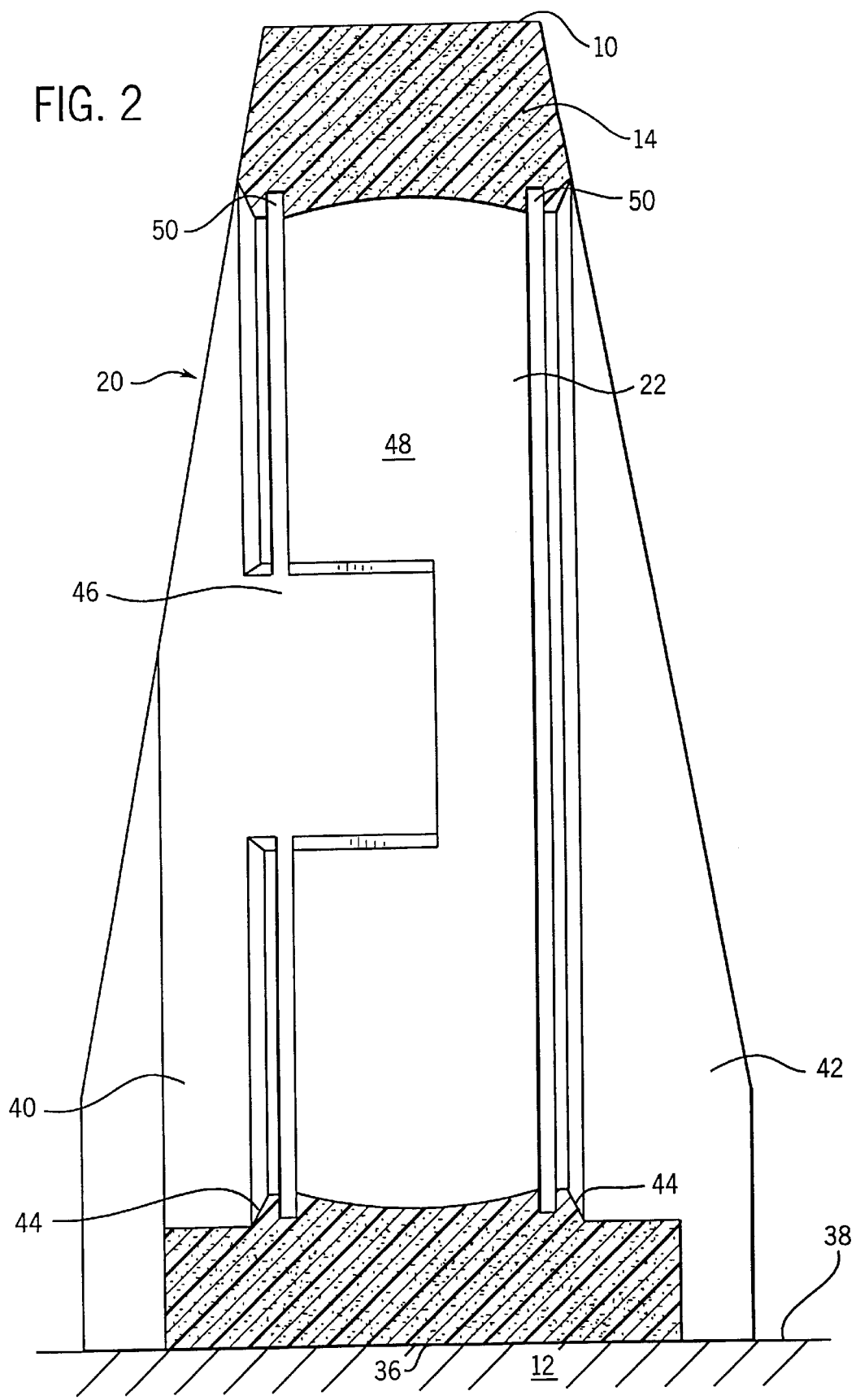
FIG. 2 is a sectional view of the bearing housing illustrated in FIG. 1 along line 2—2.

As best shown in FIG. 2, in the illustrated embodiment housing 10 has a front side 40 and a rear side 42, front side 40 being configured to facilitate insertion of a bearing insert into housing 10. Thus, front side 40 includes an entry chamfer 44 and a pair of lateral recesses 46 (see FIG. 3) at the approximate vertical midpoint of bearing support surface 22. Bearing support surface 22 comprises a spherical groove;48 formed around the entire annulus of central aperture 20. A pair of seal grooves 50 are provided on either side spherical groove 48. The foregoing structure permits a bearing insert having a spherical outer ring to be positioned and locked into housing 10 in a manner similar to that employed in conventional bearing housings. Moreover, once the bearing insert is positioned within housing 10, one or more bearing seals of generally known design may be secured in grooves 50 to inhibit the ingress of moisture and debris into housing 10. In the illustrated embodiment, housing 10 is bilaterally symmetrical permitting a cover (not shown) to be mounted over either front side 40 or rear side 42 as desired in particular applications.

Figure 3:
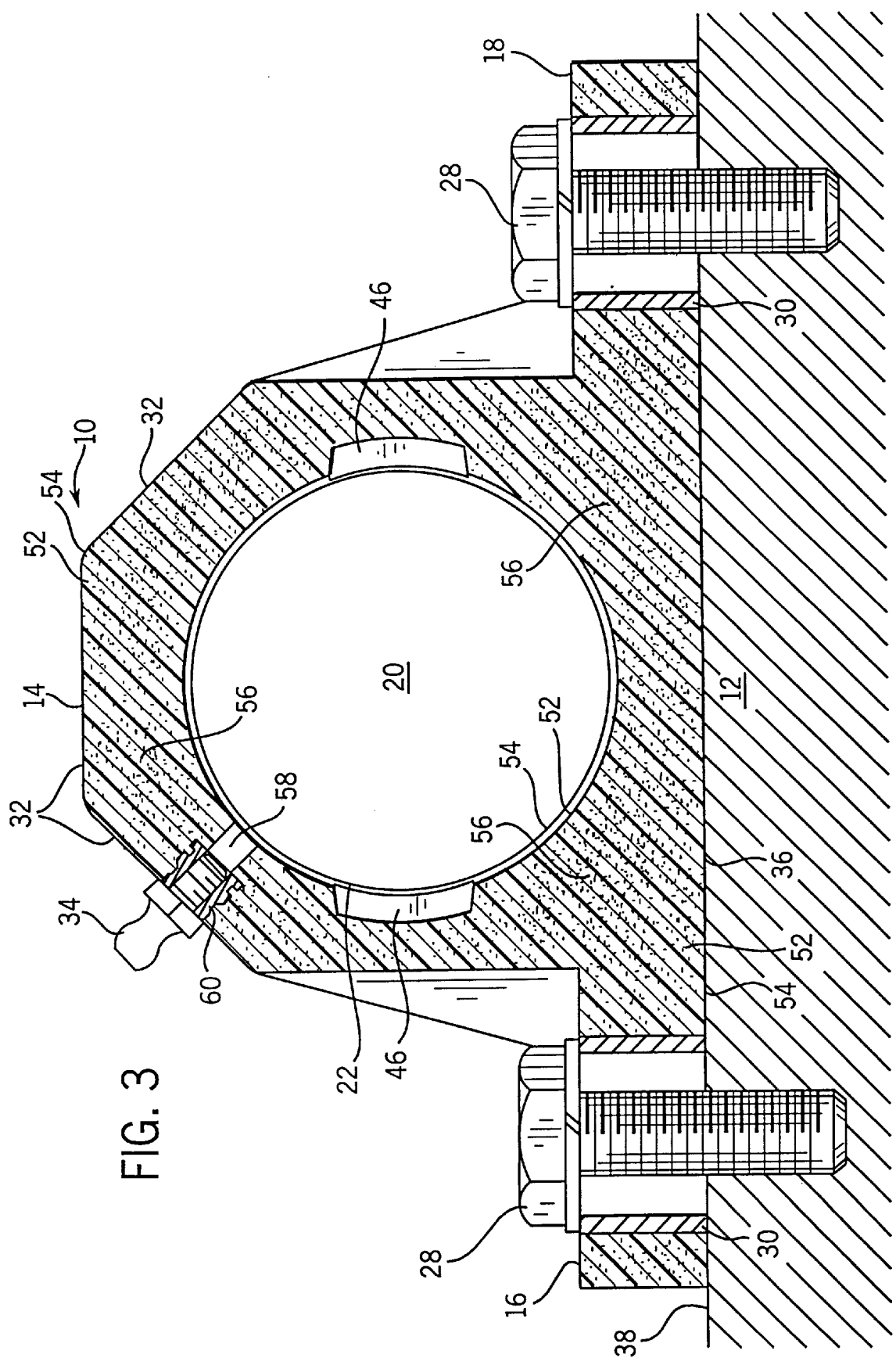
FIG. 3 is a sectional view of the housing illustrated in FIG. 1 along line 3—3.

FIG. 3 shows the foregoing structures in a transverse section of housing 10. As illustrated in FIG. 3, central region 14 is formed integrally with lateral mounting flanges 16 and 18. Moreover, support sleeves 30 extend substantially over the entire height of flanges 16 and 18 and terminate in surfaces generally flush with the upper and lower extremities of apertures 26. Once tightened in place, fasteners 28 thus bear upon sleeves 30 to securely hold housing 10 in its desired position on machine frame 12. As noted above, once secured in position, planar mounting base 36 of housing 10 conforms to planar surface 38 of machine frame 12, over substantially the entire footprint of flanges 16 and 18 and central region 14.

In the preferred embodiment illustrated, central region 14 and flanges 16 and 18 are injection molded from a polymeric material. In the presently preferred embodiment, housing 10 is formed of polybutyleneterephthalate (PBT) in combination with a reinforcing glass fiber. PBT is available from numerous commercial sources, such as DSM-Engineering Plastics of Evansville, Ind. under the commercial designation Arnite®. The particular resin utilized preferably complies with U.S. Food and Drug Administration Standards for use in food and beverage industries, such as those found in 21 C.F.R. 177.1660. Moreover, the resins utilized for housing 10 may include pigments complying standards promulgated in 21 C.F.R. 178.3297. To facilitate the formation of planar mounting base 36 coextensive with the footprint of housing 10, the polymeric material of which housing 10 is formed preferably constitutes a structural foam material formed by endothermic chemical nucleating and foaming agents added to the polymeric material prior to injection molding. An acceptable foaming agent for the PBT material presently preferred is commercially available from BI Chemical, Specialty Products Division, Winchester, Va. under the commercial designation Hydrocerol CF 40. As will be appreciated by those skilled in the art, such foaming agents may be added to the polymeric material prior to injection molding to induce direct gassing to form a very fine cell foam.

Figure 9:
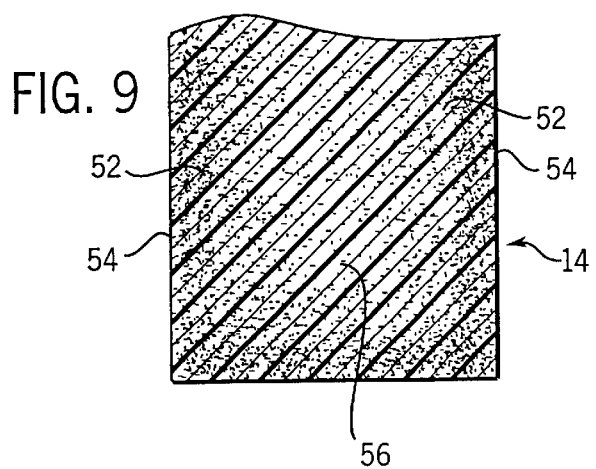
FIG. 9 is a detailed view of a portion of a bearing housing in accordance with certain aspects of the invention illustrating relative densities of a structural foam material of which the housing is constructed in accordance with a preferred embodiment.

It has been found that the use of a structural foam for housing 10 permits the formation of relatively large volumes in certain regions of housing 10 in combination with relatively thin structures in other regions while resisting material drawing. Specifically,. boundary regions 52 may be formed adjacent to external surfaces 54 of housing 10 while internal regions 56 extend therebetween. Such boundary regions are of relatively higher density than internal regions 56. Moreover, the combination of the polymeric base material with the foaming agent forms a generally closed skin over the entire external surface 54 of housing 10. As best illustrated in FIG. 9, a density gradient is therefore defined between boundary regions 52 lying closely adjacent to external surface 54 and internal regions 56 lying within the larger volumes of housing 10. In the presently preferred embodiment, density variations of some 5 to 10 percent have been found to stabilize between external surface 54 and internal regions 56. As will be appreciated by those skilled in the art, the particular density gradient locations and the density variations extending through the gradients will vary with the local geometry of the housing, with larger volume sections having lower density internal regions than thinner or lower volume sections.

In addition to fiber reinforcing components and a foaming agent, in the presently preferred embodiment, housing 10 includes an antimicrobial agent additive for inhibiting the growth and proliferation of bacteria, fungi, microorganisms and the like. As used herein, the terms "microorganisms" and "antimicrobial agent" are intended to refer generally to all such plant and microbial forms. As will be appreciated by those skilled in the art, such antimicrobial agents may be added to the polymeric material prior to injection molding and remain effective following the molding process. An acceptable antimicrobial agent is commercially available from Thompson Research Associates of Toronto, Ontario, Canada under the commercial designation Ultra-Fresh®.

In the presently preferred embodiment, most external surfaces 54 of housing 10 are formed during the molding process. Specifically, mounting apertures 26 are formed around support sleeves 30 which are inserted into the mold cavity prior to injection of the polymeric material. Moreover, a short lubricant channel 58 is preferably formed through an upper portion of the housing by means of a suitable core pin. Lubricant channel 58 extends from one of faceted surfaces 32 through an upper portion of central region 14 to bearing support surface 22. To accommodate lubricant fitting 44, a threaded sleeve 60 is provided in channel 58. Sleeve 60 is preferably held by the core pin used to form channel 58 during the molding process, thereby embedding sleeve 60 into housing 10 during the molding process. As illustrated, sleeve 60 includes a grooved outer profile to reduce the risk of pullout once embedded into housing 10. It should be noted that this preferred structure facilitates conversion of housing 10 to a permanently lubricated bearing housing by elimination of the core used to form channel 58 and to embed sleeve 60. Moreover, the use of faceted upper faces 32 allows the core to be eliminated while avoiding the creation of a cosmetic blemish in the previous location of the core.

Internal features of bearing support surface 22 are preferably formed by machining operations subsequent to removal of housing 10 from its mold. Thus, spherical groove 48 and seal grooves 50 are preferably formed by turning operations. This preferred methodology both reduces tooling costs for the injection molding process and facilitates special configurations of housing 10 via the subsequent machining operations.

Figure 4:
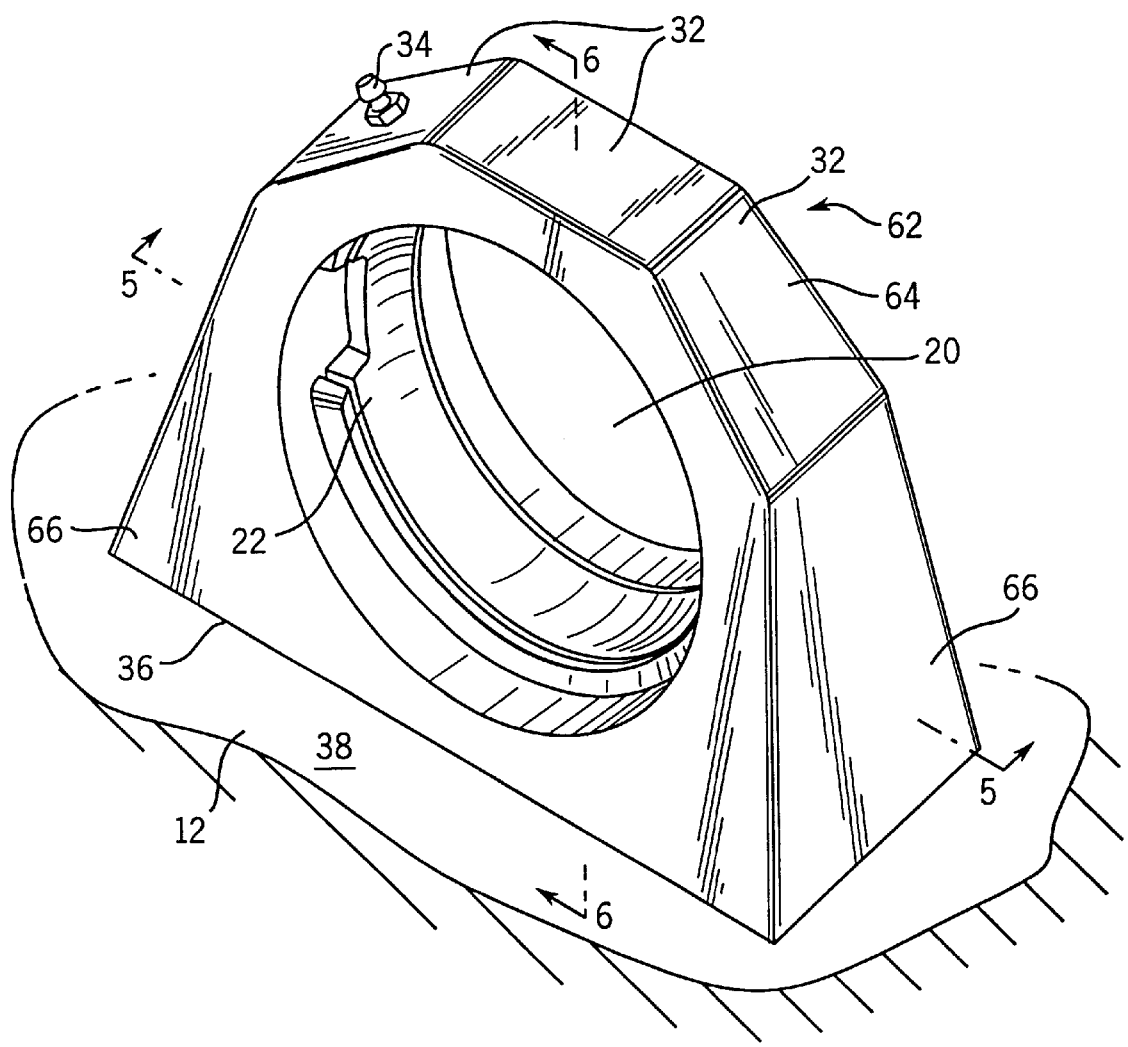
FIG. 4 is a perspective view of a tapped base pillow block style bearing housing in accordance with certain aspects of the invention.
Figure 5:
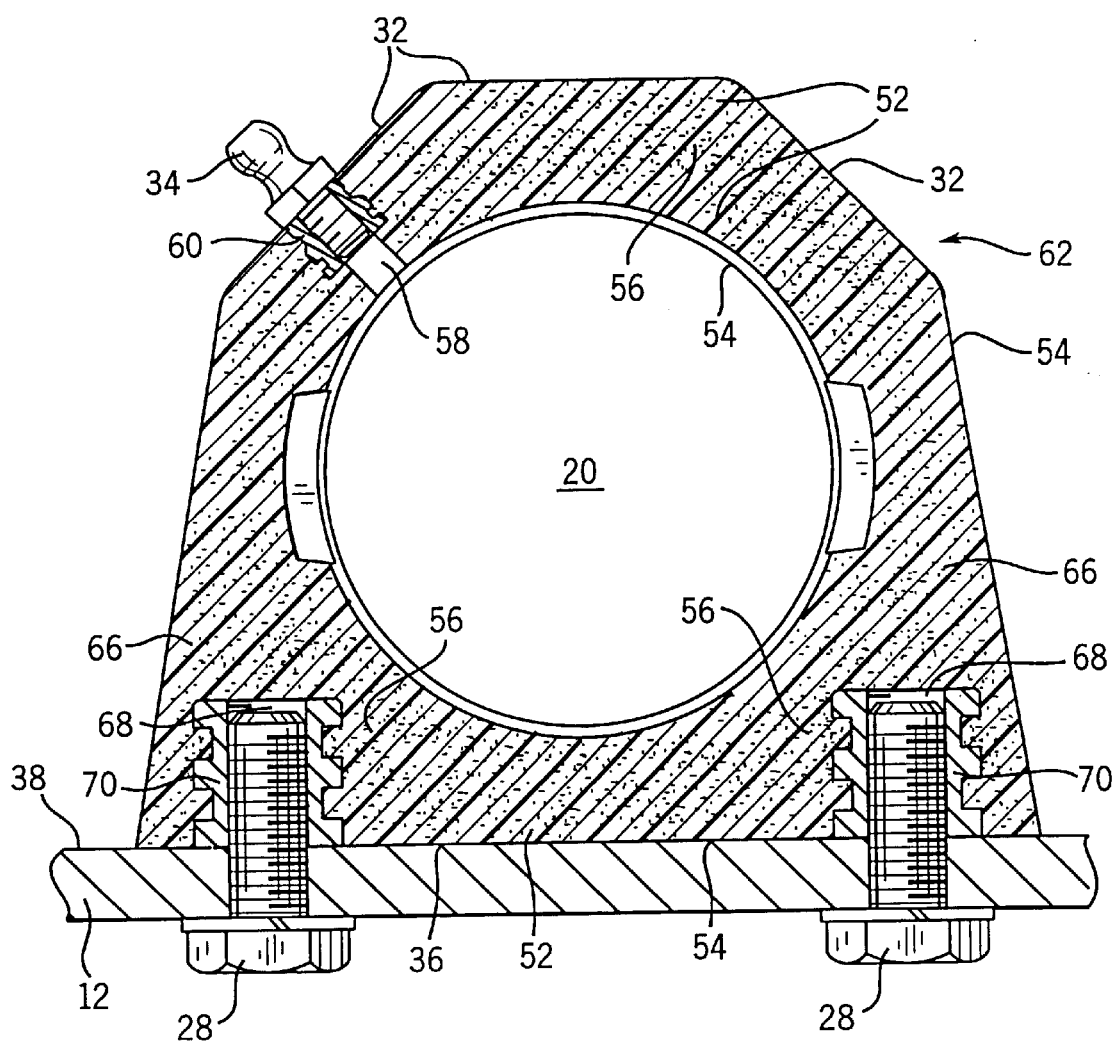
FIG. 5 is a sectional view of the bearing housing illustrated in FIG. 4 along line 5—5.
Figure 6:
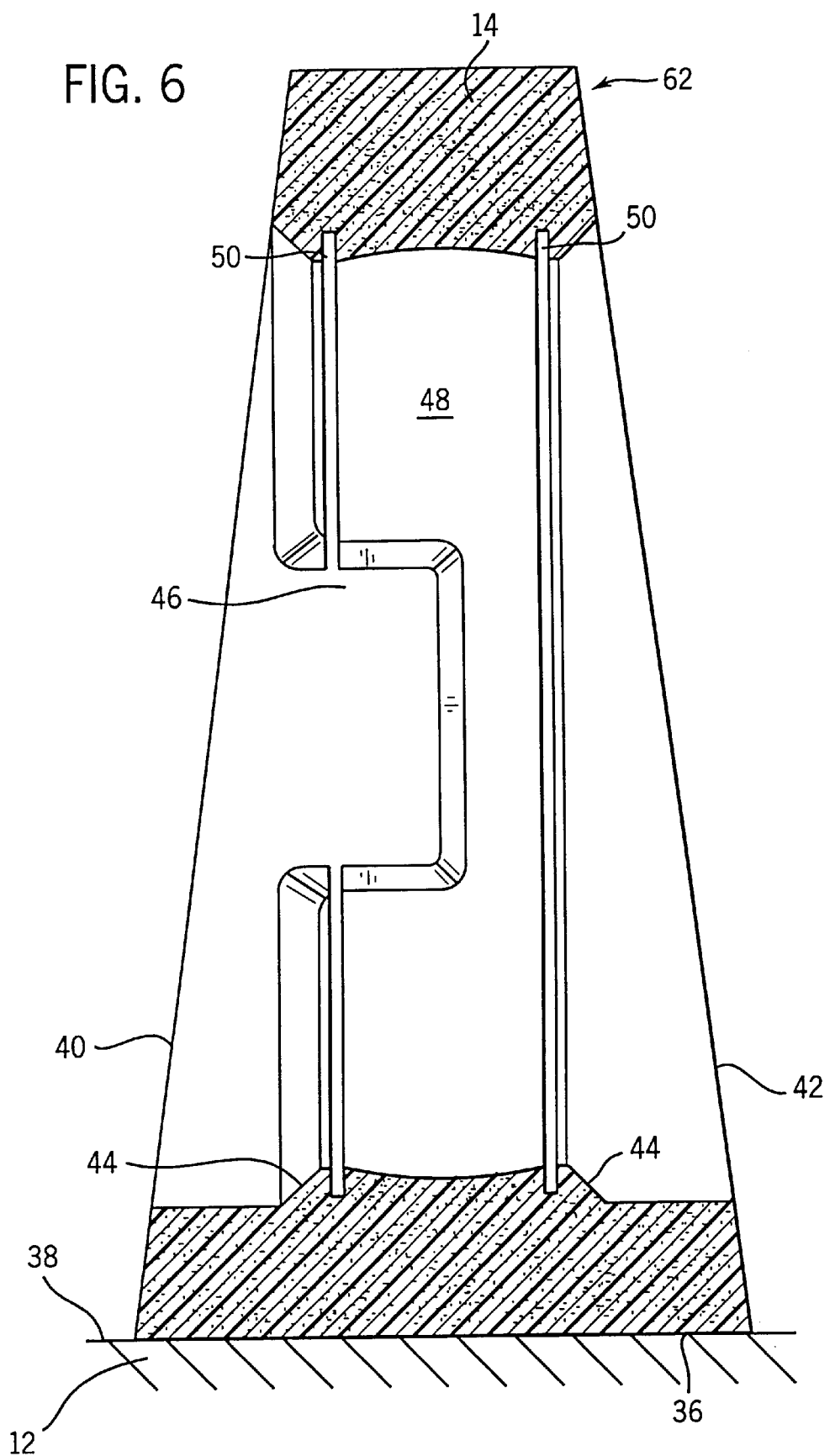
FIG. 6 is a sectional view of the bearing housing illustrated in FIG. 4 along line 6—6.

As mentioned above, the innovative features of the present bearing housing design may be incorporated in various housing styles. FIGS. 4 through 6 illustrate a tapped base pillow block housing constructed in accordance with the features described above. The tapped base pillow block housing illustrated, designated generally by the reference numeral 62, includes an upper central portion 64 from which lateral supports 66 extend. Bolt apertures 68 are formed in each lateral support 66, as illustrated in FIG. 5. Tapped sleeves 70, preferably made of stainless steel, are provided within each bolt aperture 68 for receiving and interfacing with threaded fasteners 28. In the illustrated embodiment, sleeves 70 have a grooved profile to resist pullout. Portions of the profile may be faceted (e.g. hexagonal) to resist twisting within the housing under the influence of fasteners 28. Each sleeve is preferably inserted by means of a core provided in the mold used to form housing 62. As discussed above with respect to housing 10, housing 62 is preferably formed of a polymeric material such as PBT and includes a glass fiber reinforcing component. Moreover, in the preferred embodiment a planar mounting base 36 is formed on housing 62 such that housing 62 may be mounted directly on a planar mounting surface 38 of a machine frame with no interstice therebetween. To facilitate formation of planar mounting base 36, a foaming agent is added to the polymeric material used to mold housing 62, creating boundary regions 52 between which internal regions 56 of lower density stabilize as discussed above. In the embodiment illustrated in FIGS. 4 through 5, features of the molded housing are formed via subsequent machining operations, such as spherical bearing support group 48 (see FIG. 6) and seal grooves 50 on either side of spherical groove 48.

Figure 7:
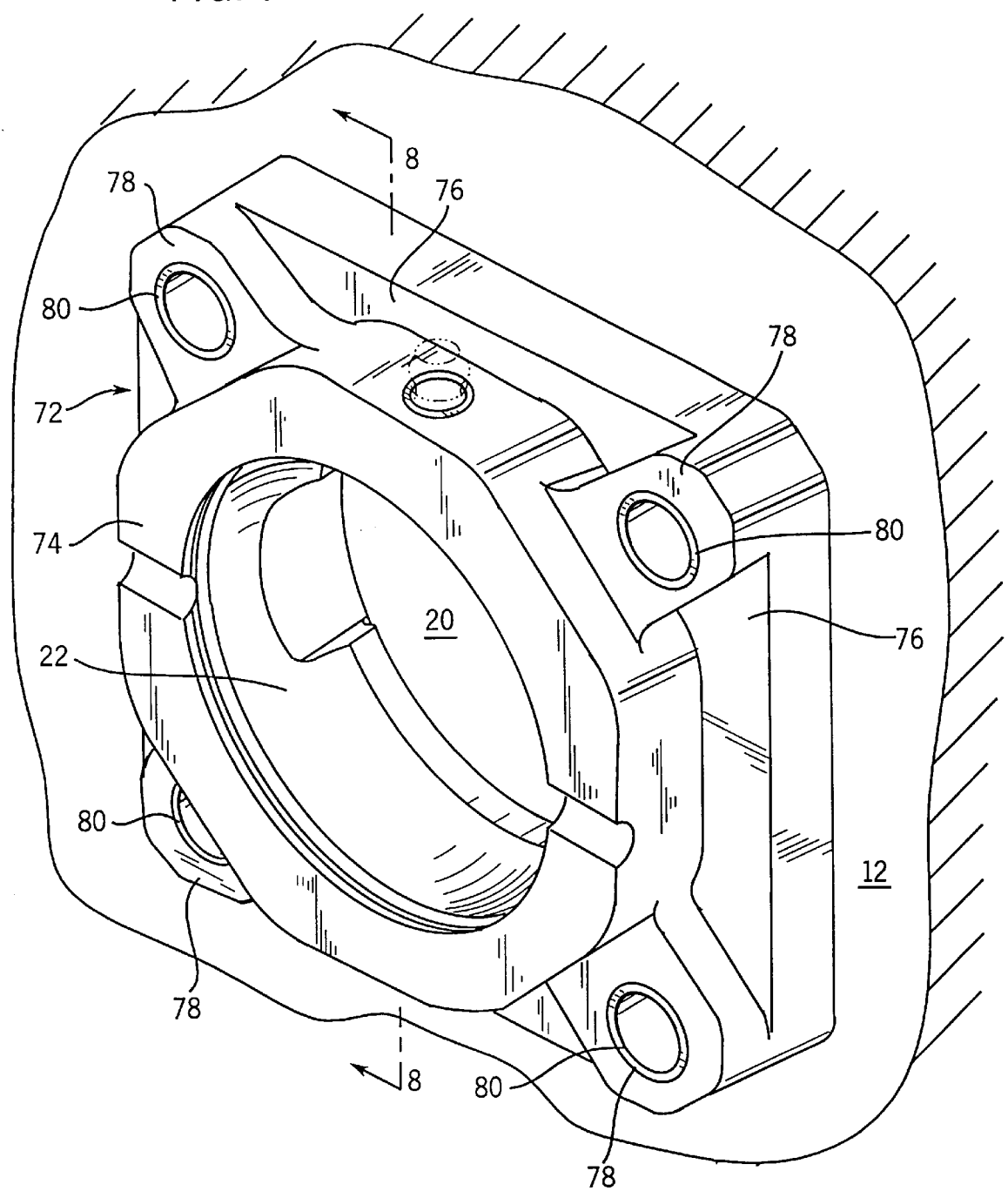
FIG. 7 is a perspective view of a further alternative configuration wherein the bearing housing is formed as a four-bolt flanged arrangement.
Figure 8:
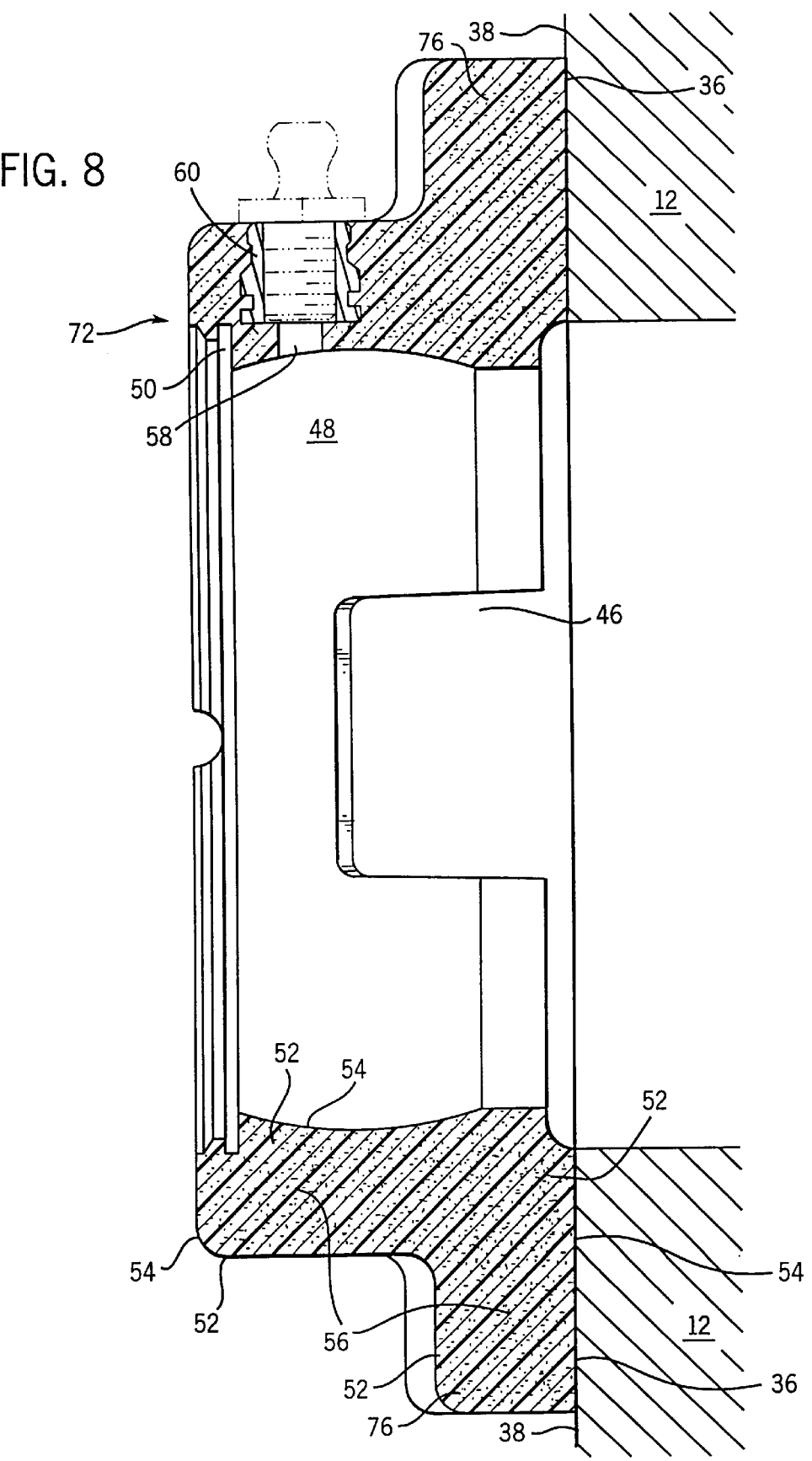
FIG. 8 is a sectional view of the bearing housing of FIG. 7 along line 8—8.

FIGS. 7 and 8 illustrate a four bolt flanged bearing housing incorporating the innovative features described above. Thus, as shown in FIG. 7, a four bolt flanged housing 72 includes a raised central portion 74 surrounded by a peripheral flange 76. A central aperture 20 is formed in central portion 74 and a bearing support surface 22 surrounds central aperture 20 as described above with reference to housings 10 and 62. Raised fastener supports 78 are formed in each corner of flange 76 for receiving fasteners used to secure housing 72 to a planar machine support surface. Support sleeves 80, preferably formed of stainless steel, are lodged within each fastener support 78 to interface with fasteners and to prevent crushing of fastener supports 78. As illustrated in FIG. 8, a lubrication channel 58 is formed in central portion 74 and a lubrication fitting sleeve 60 is lodged within channel 58 for receiving a lubrication fitting as described above. Lubrication channel 58 communicates with bearing support surface 22, and specifically with spherical groove 48. As in the previous embodiments, housing 72 is formed of a polymeric base material including a glass fiber reinforcing component. A foaming agent is added to the material prior to molding to create a structural foam in internal regions as designated by reference numeral 56. Also as in the previous embodiments, a planar mounting base 36 is formed which directly contacts a planar mounting surface 38 of a machine frame when housing 72 is placed in service. It should be noted that due to the annular configuration of housing 72, the footprint of planar mounting base 36 is similarly annular. As in the previous embodiments, certain features of housing 72 are preferably formed by subsequent machining operations following the molding process. Specifically, spherical groove 48 and a seal groove 50 are formed by turning operations.

Figure 10:
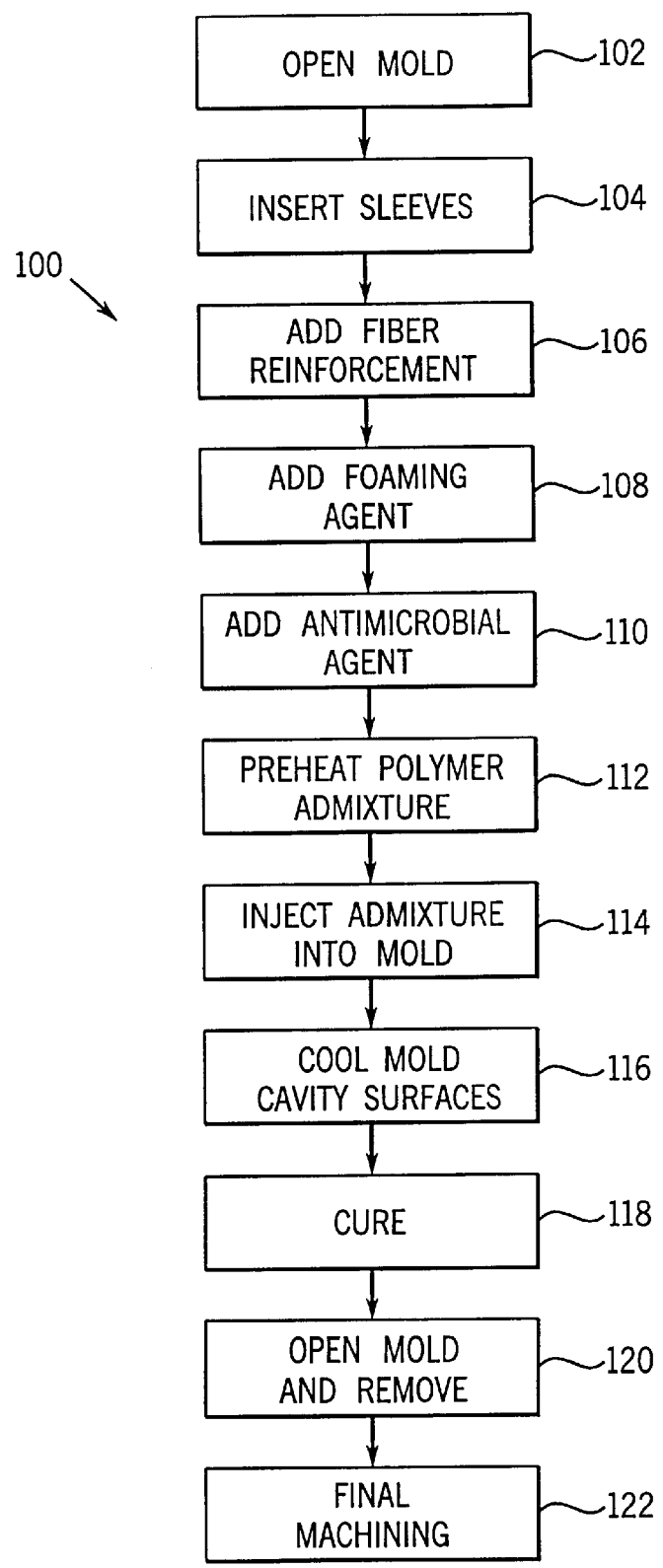
FIG. 10 is a flow chart illustrating exemplary manufacturing process steps in a preferred method for manufacturing a bearing housing in accordance with the invention.

As mentioned above, the housings of the present invention are formed by a sequence of operations including a molding process in which a specific polymeric formulation is created to lend favorable properties to the housings in their final form. FIG. 10 illustrates exemplary steps in the manufacturing process used to form the housings. Prior to the specific manufacturing steps enumerated in FIG. 10, a suitable mold is formed in accordance with generally known techniques. Specifically, it has been found that the desired shapes can be created in a two-part mold in which retractable cores are utilized to form the cavities and apertures described above. Moreover, as will be appreciated by those skilled in the art, cooling coils are provided adjacent to mold cavity surfaces in order to afford temperature control during the curing of the housings. Such temperature control is desirable to create a generally closed skin over the entire exterior surface of the housings and to modulate the formation of density gradients in the structural foam material.

The manufacturing process, designated generally by reference numeral 100 in FIG. 10, begins with opening the mold cavity as indicated at step 102. Sleeves to be included in the final housing are then inserted into the mold cavity as indicated at step 104, being held in place by suitable cores or internal protrusions formed in the cavity. The specific sleeves utilized and their locations will vary depending upon the housing type, but will generally include stainless steel sleeves within each fastener aperture and a lubrication fitting sleeve for lubricated bearings. Moreover, in the illustrated embodiments, cores are provided for forming both the central aperture in the housings as well as the mounting fastener apertures and the lubricant channel as described above.

The desired admixture of the base polymeric material and other agents is prepared as indicated at steps 106 through 112. If the base polymeric material does not already include a glass fiber reinforcing component, this component is added as indicated at step 106. At step 108, a foaming agent is added to the admixture to provide the gassing desired for creation of the structural foam as described above. As indicated at step 110, an antimicrobial agent is then added to the admixture of polymer, glass fiber reinforcing material and foaming agent. Where a thermoplastic base material is utilized, such as PBT, the polymer admixture is preheated as indicated at step 112. It should be noted that the foregoing steps may occur in various orders depending upon the specific materials utilized and their initial and desired forms. For example, in specific applications where an antimicrobial agent is not to be used, such as in certain chemical processing applications, step 110 may be eliminated. Similarly, in certain applications calling for the use of an antimicrobial agent in a non-structural foam product, the addition of foaming agent may be dispensed with.

At step 114, the admixture is injected into the mold cavity, and at step 116 the internal surfaces of the mold cavity are cooled to promote the creation of a density gradient in the housing, particularly through larger volume regions. The housing is then allowed at least partially to cure as indicated at step 118 and, following the cure period, the mold is opened and the housing is removed as indicated at step 120. In the present embodiment, the molded body is permitted to partially cure in the mold and subsequently to air cure following removal from the mold. Where final features of the housing are still in need of definition, as in the preferred embodiment, final machining operations are performed on the housing blank as shown at step 122. Specifically, internal grooves and similar features may be conveniently formed by such machining operations, reducing the need for special cores.

While the invention may be susceptible to various modifications and alternative forms, specific embodiments have been shown by way of example in the drawings and have been described in detail herein. However, it should be understood that the invention is not intended to be limited to the particular forms disclosed. Rather, the invention is to cover all modifications, equivalents, and alternatives falling within the spirit and scope of the invention as defined by the following appended claims.

What is claimed is:

1. A support housing for a bearing insert, the bearing insert including an inner race, an outer race and a plurality of bearing elements disposed therebetween, the support housing comprising:
   a bearing insert support portion configured to receive and support the bearing insert; and
   an attachment portion integral with the bearing insert support portion, the attachment portion including a plurality of apertures configured to receive fasteners for securing the support housing to a machine support surface, and a single, substantially continuous uniplanar mounting surface;
   wherein the bearing insert support portion and the attachment portion comprise an admixture of a moldable polymeric material and an antimicrobial agent for inhibiting growth of microorganisms, wherein the admixture further includes a fiberglass reinforcing component.

2. The support housing of claim 1, wherein the attachment portion forms a base on which the support housing is mounted when placed in service.

3. The support housing of claim 1, wherein the moldable polymeric material comprises a structural foam.

4. The support housing of claim 3, wherein the housing forms a substantially closed skin on outer surfaces thereof and a porous structure within interior regions bounded by the skin.

5. A support housing for a bearing, the housing comprising:
   a body made of a moldable plastic material and forming a bearing support surface for receiving a bearing insert and a mounting surface for securing the housing to a machine surface, outer surfaces of the housing being exposed and the mounting surface being supported on the machine surface when the housing is mounted thereon, the body including an antimicrobial agent, the antimicrobial agent inhibiting growth of microbes on the outer surfaces and on the mounting surface, wherein the body includes boundary regions having a first densities adjacent to the outer and mounting surfaces of the housing and an internal regions having second densities between the boundary regions, the first densities being greater than the second densities.

6. A support housing for a bearing, the housing comprising:
   a body made of a moldable plastic material and forming a bearing support surface for receiving a bearing insert and a mounting surface for securing the housing to a machine surface, outer surfaces of the housing being exposed and the mounting surface being supported on the machine surface when the housing is mounted thereon, the body including an antimicrobial agent, the antimicrobial agent inhibiting growth of microbes on the outer surfaces and on the mounting surface, wherein the body comprises an admixture of a moldable plastic material and a fibrous reinforcement material.

7. The support housing of claim 6, wherein the body includes boundary regions having a first densities adjacent to the outer and mounting surfaces of the housing and an internal regions having second densities between the boundary regions, the first densities being greater than the second densities.

8. The support housing of claim 6, wherein the body is a unitary structure made of an admixture of a moldable plastic material and the antimicrobial agent.

9. The support housing of claim 6, wherein the body is a structural foam including a substantially closed skin on the outer surfaces and the mounting surface and a porous interior region within the skin.

10. The support housing of claim 6, wherein the mounting surface of the body is substantially planar and is substantially flush with the machine surface when the support housing is mounted thereon.

11. The support housing of claim 6, including apertures extending through portions of the body and transverse to the mounting surface, each of the apertures including a metallic reinforcing insert for receiving a fastener for securing the housing to a machine surface.

12. The support housing of claim 6, wherein the bearing support surface is formed by an inner periphery of an aperture extending substantially transverse to the mounting surface.

13. A support housing for a bearing insert, the bearing insert including an inner race, an outer race and a plurality of bearing elements disposed therebetween, the support housing comprising:

a bearing insert support portion configured to receive and support the bearing insert; and an attachment portion integral with the bearing insert support portion, the attachment portion including a plurality of apertures configured to receive fasteners for securing the support housing to a machine support surface;

wherein the bearing insert support portion and the attachment portion comprise an admixture of a moldable structural foam polymeric material and an antimicrobial agent for inhibiting growth of microorganisms, the housing forming a substantially closed skin on outer surfaces thereof and a porous structure within interior regions bounded by the skin.

14. The support housing of claim 13, wherein the structural foam has a varying density from the skin to the interior regions.

15. The support housing of claim 13, wherein the attachment portion forms a base on which the support housing is mounted when placed in service, and wherein the base includes a base mounting surface extending substantially in a plane and coextensive with the base.

16. The support housing of claim 13, wherein the admixture further includes a fibrous reinforcing material.

17. The support housing of claim 16, wherein the fibrous reinforcing material includes a fiberglass reinforcing component.

18. The support housing of claim 13, wherein the mounting portion includes a substantially planar mounting surface for securing the housing to a machine surface.

19. The support housing of claim 18, wherein the mounting surface is substantially flush with the machine surface when the support housing is mounted thereon.

* * * * *